US012660751B2

(12) United States Patent (10) Patent No.: US 12,660,751 B2

Heitmann et al. (45) Date of Patent: Jun. 23, 2026

(54) SELF-PROPELLED FORAGE HARVESTER AND METHOD FOR OPERATING A FORAGE HARVESTER

(71) Applicant: CLAAS Selbstfahrende Erntemaschinen GmbH, Harsewinkel (DE)

(72) Inventors: Christoph Heitmann, Warendorf (DE); Dennis Neitemeier, Lippetal (DE); Markus Brune, Harsewinkel (DE); Gregor Wehner, Ostrach Unterweiler (DE); Sebastian Harsch, Bad Saulgau (DE); Ingo Bönig, Gütersloh (DE); Marwin Klein-Heimkamp, Bramsche (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 673 days.

(21) Appl. No.: 18/101,761

(22) Filed: Jan. 26, 2023

(65) Prior Publication Data

US 2023/0232740 A1 Jul. 27, 2023

(30) Foreign Application Priority Data

Jan. 27, 2022 (DE) ..................... 10 2022 101 895.4

(51) Int. Cl.
*A01D 41/127* (2006.01)
*A01F 29/09* (2010.01)
*B26D 7/12* (2006.01)

(52) U.S. Cl.
CPC ........ *A01D 41/1274* (2013.01); *A01F 29/095* (2013.01); *B26D 7/12* (2013.01)

(58) Field of Classification Search
CPC .. A01D 41/1274; A01D 75/08; A01D 43/085; A01F 29/095; B26D 7/12
See application file for complete search history.

(56) References Cited

U.S. PATENT DOCUMENTS

| | | | | | |
|---|---|---|---|---|---|
| 4,319,718 A | * | 3/1982 | Snavely | ................. | A01D 75/08 |
| | | | | | 241/222 |
| 4,799,625 A | * | 1/1989 | Weaver, Jr. | ............. | A01F 29/09 |
| | | | | | 340/684 |

(Continued)

FOREIGN PATENT DOCUMENTS

| | | | | |
|---|---|---|---|---|
| DE | 102017201421 A1 | * | 8/2018 | ........... A01F 29/095 |
| DE | 102019112973 A1 | | 11/2020 | |

(Continued)

OTHER PUBLICATIONS

Translation of Document DE-102017201421-A1 as retrieved on Aug. 28, 2025 (Year: 2018).*

(Continued)

*Primary Examiner* — Joseph M Rocca
*Assistant Examiner* — Jose Antonio Martinez
(74) *Attorney, Agent, or Firm* — Lempia Summerfield Katz LLC

(57) ABSTRACT

A self-propelled forage harvester is disclosed that includes a blade sharpening and shear bar adjusting device, a monitoring device configured to cyclically generate information on the state of the cutterhead chopping glades and the distance of the shear bar to the cutting edge, and a control unit. The control unit evaluates the information provided by the monitoring device about the state of wear of the chopping blades and the distance, compares it with a limit value for the state of wear and/or the distance, where the limit value forms a lower limit for an optimum range to be maintained by the blade sharpening and shear bar adjusting device, of the instantaneous cutting sharpness of the chopping blades or of (Continued)

43
17 42
41
44 45 22
40 21
27
3 4 6 49

Manual Mode:
--- specification or selection of the number of sharpening cycles and adjustment operations relative to data that can be entered or selected on the harvesting performance (area and/or yield) and/or harvesting duration ~46
--- reminder to perform sharpening cycles and/or adjustment operation
--- manual confirmation of performance by operator Automatic mode:
--- determination of set number of sharpening cycles and adjustment operations relative to the harvesting performance (area and/or yield) and/or harvesting duration saved in the order management system ~47
--- strategy based control
--- crop type-dependent control Fully automated mode:
automatic control of the sharpening process and/or shear bar adjustment depending on signals from the cutting sharpness sensor array of the monitoring device ~48 the distance and, when the limit value is reached, automatically triggers a sharpening process and/or of a shear bar adjustment by the blade sharpening and shear bar adjusting device.

20 Claims, 4 Drawing Sheets

(56)                    References Cited

U.S. PATENT DOCUMENTS

| | | | |
|---|---|---|---|
| 11,835,955 B2 * | 12/2023 | Richard ................... | E02F 9/267 |
| 2005/0072135 A1 | 4/2005 | Kormann | |
| 2007/0271893 A1 | 11/2007 | Pollklas et al. | |
| 2013/0042591 A1 * | 2/2013 | Behnke ................... | A01F 29/22 |
| | | | 56/10.2 A |
| 2018/0206408 A1 * | 7/2018 | Stein ........................ | A01F 29/06 |
| 2020/0359563 A1 | 11/2020 | Heitmann et al. | |
| 2022/0361405 A1 * | 11/2022 | Heitmann ............ | A01D 43/085 |

FOREIGN PATENT DOCUMENTS

| | | | |
|---|---|---|---|
| EP | 1522214 A2 | 4/2005 | |
| EP | 1862061 A1 | 12/2007 | |

OTHER PUBLICATIONS

European Search Report for European application No. 22207246. 4-1105 mailed Jun. 29, 2023.

* cited by examiner

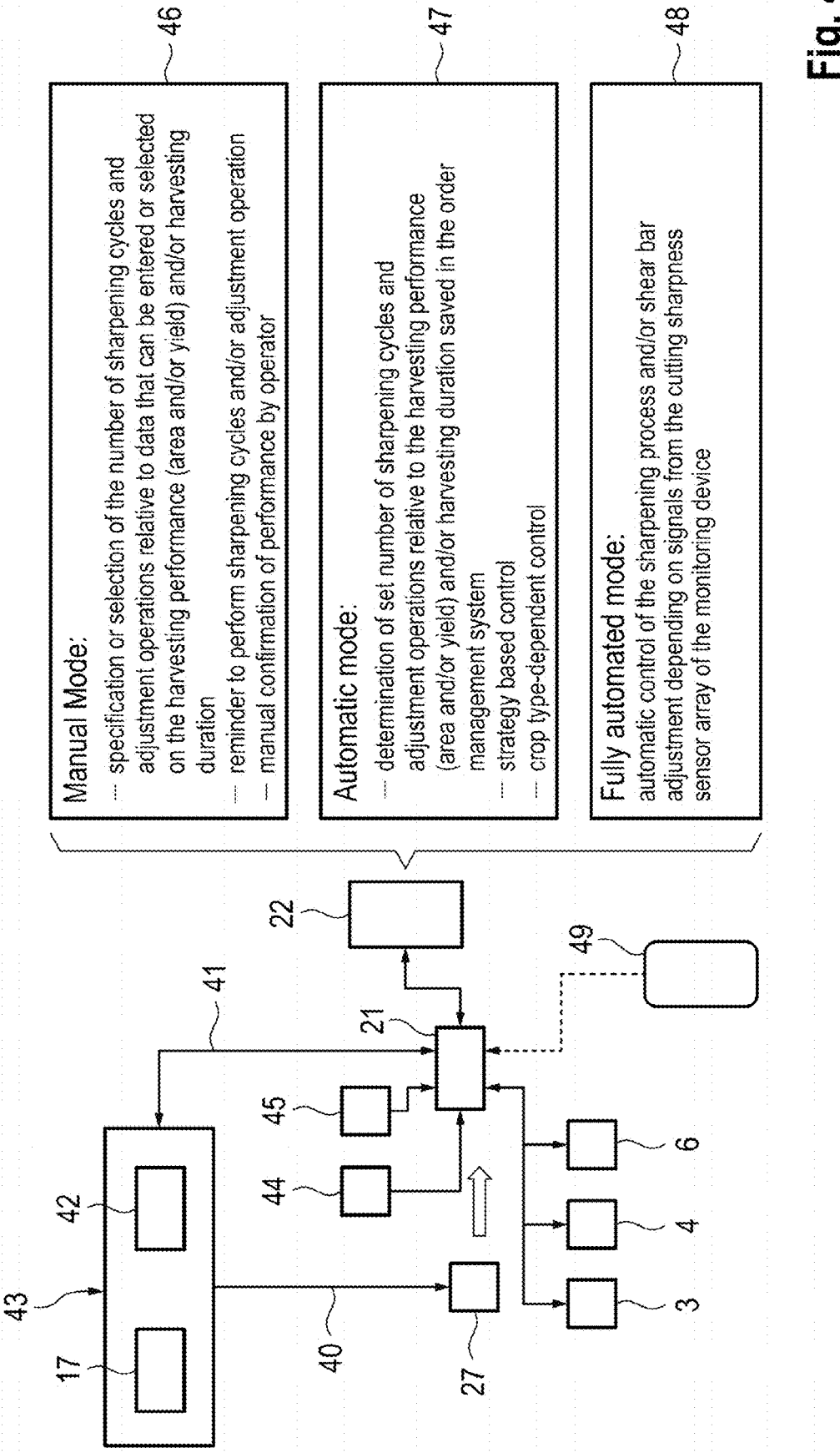

Manual Mode:
— specification or selection of the number of sharpening cycles and adjustment operations relative to data that can be entered or selected on the harvesting performance (area and/or yield) and/or harvesting duration
— reminder to perform sharpening cycles and/or adjustment operation
— manual confirmation of performance by operator

Automatic mode:
— determination of set number of sharpening cycles and adjustment operations relative to the harvesting performance (area and/or yield) and/or harvesting duration saved in the order management system
— strategy based control
— crop type-dependent control

Fully automated mode:
automatic control of the sharpening process and/or shear bar adjustment depending on signals from the cutting sharpness sensor array of the monitoring device

Fig. 4

SELF-PROPELLED FORAGE HARVESTER AND METHOD FOR OPERATING A FORAGE HARVESTER

CROSS REFERENCE TO RELATED APPLICATION

This application claims priority under 35 U.S.C. § 119 to German Patent Application No. DE 10 2022 101 895.4 filed Jan. 27, 2022.

TECHNICAL FIELD

The present invention relates to a self-propelled forage harvester and a method for operating a self-propelled forage harvester.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

US Patent Application Publication No. 2007/0271893 A1, incorporated by reference herein in its entirety, discloses a self-propelled forage harvester that comprises a blade sharpening device configured to automatically resharpening chopping blades arranged or positioned on a cutterhead. The cutting blades are resharpened during the so-called non-work operation of the forage harvester, which refers to forced interruptions of the ongoing harvesting process that may occur while traveling through the headland. The chopping blades may be re-sharpened while traveling in the headland.

BRIEF DESCRIPTION OF THE DRAWINGS

The present application is further described in the detailed description which follows, in reference to the noted drawings by way of non-limiting examples of exemplary implementation, in which like reference numerals represent similar parts throughout the several views of the drawings, and wherein:

FIG. 4 shows a simplified functional diagram of the interaction of the control unit, monitoring device and blade sharpening and shear bar adjusting device of the forage harvester.

DETAILED DESCRIPTION

Figure 1:
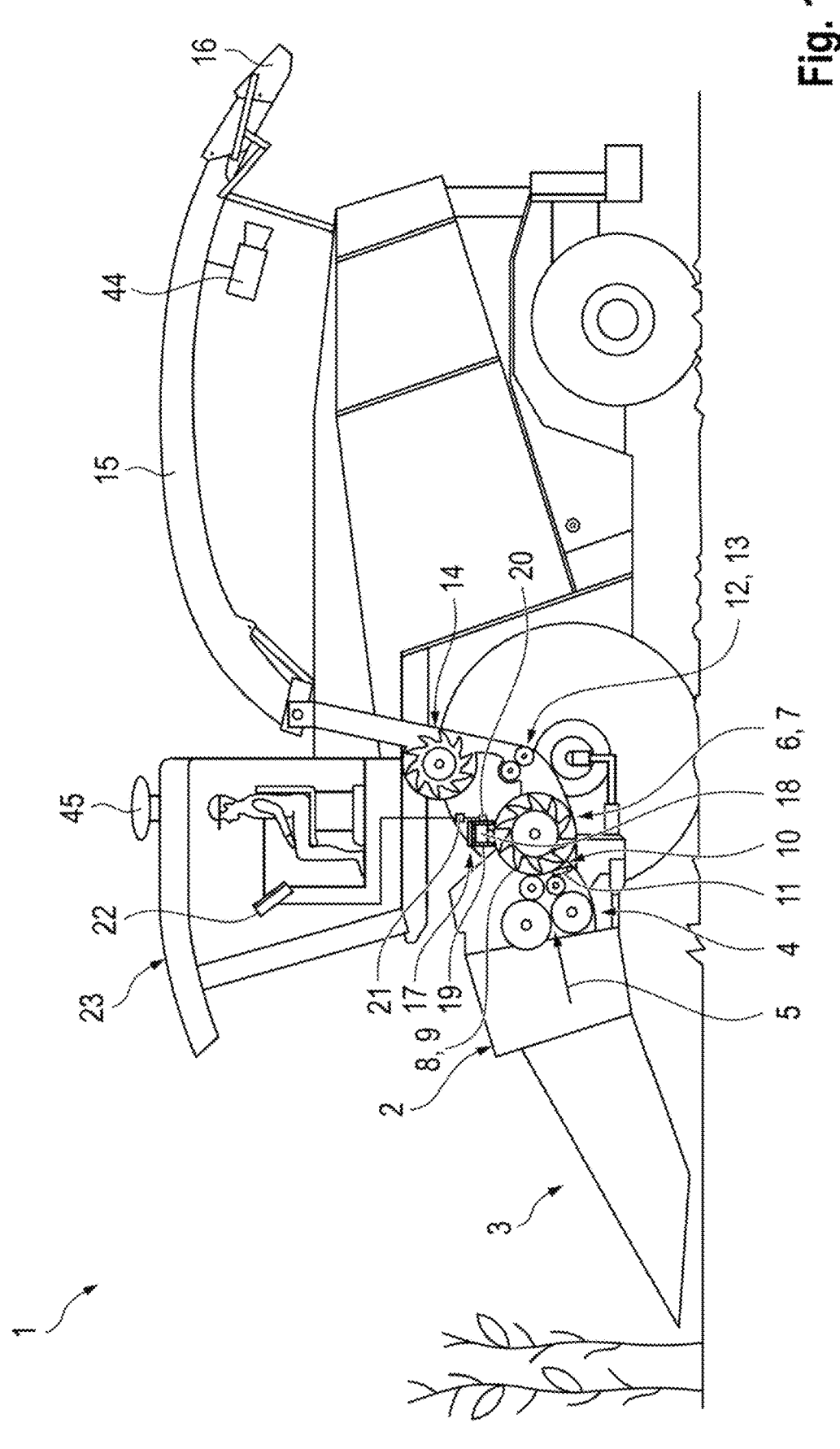
FIG. 1 shows a schematic representation of a self-propelled forage harvester.

As discussed in the background, US Patent Application Publication No. 2007/0271893 A1 discloses a self-propelled forage harvester that includes a blade sharpening device configured to automatically resharpening chopping blades arranged or positioned on a cutterhead. However, US Patent Application Publication No. 2007/0271893 A1 may not take into account the state of wear of the chopping blades or the distance between a shear bar and the cutting edge of the chopping blades. Rather, according to US Patent Application Publication No. 2007/0271893 A1, resharpening may be performed independently of the actual state of wear, which may mean that the wear caused by resharpening may be greater than the actual wear resulting from the chopping of harvested material. A necessary adjustment of the distance between the shear bar and the cutting edge of the chopping blades may also not be taken into account in US Patent Application Publication No. 2007/0271893 A1, which may negatively affect the chopping quality as well as the energy consumption due to the increased power requirement of the chopping apparatus of the forage harvester.

As such, in one or some embodiments, the disclosed system and method comprise a self-propelled forage harvester that may consider or account for the actual state of wear, thereby potentially avoiding a decrease in cutting sharpness.

In particular, a self-propelled forage harvester is disclosed which comprises a blade sharpening and shear bar-adjusting device that is configured to: regrind chopping blades arranged or positioned on a cutterhead; and/or to adjust/or adapt the distance of a shear bar associated with the cutter-head from the cutting edge of the chopping blades. The self-propelled forage harvester may further include least one monitoring device that is configured to generate data (such as cyclically or periodically) generate data which may contain information about or be indicative of the state of wear (such as the current state of wear) of the chopping blades and/or the distance of the shear bar from the cutting edge. In one or some embodiments, the forage harvester comprises a control unit that is configured to: evaluate the information provided by the monitoring device, such as cyclically, about the state of wear of the chopping blades and/or the distance of the shear bar to the cutting edge of the chopping blades; compare it with a limit value for the state of wear and/or the distance; and when at least one limit value is reached, automatically command (e.g., automatically trigger an initialization of) a sharpening process and/or of a shear bar adjustment by the blade sharpening and shear bar adjusting device (e.g., the control unit may automatically command the blade sharpening and shear bar adjusting device to perform one or both of the sharpening process and/or of the shear bar adjustment). Thus, various limit values are contemplated. As one example, the limit value may comprise a predefined lower limit (e.g., predefined by the operator and/or preprogrammed in a memory accessible by the control unit) to be maintained by the blade sharpening and shear bar adjusting device, of the instantaneous cutting sharpness of the chopping blades, or of the distance during the harvesting process. More specifically, the limit value may form a lower limit for an optimum range to be maintained by the blade sharpening and shear bar adjusting device, of the instantaneous cutting sharpness of the chopping blades and/or of the distance during the harvesting process. In one or some embodiments, the execution of the sharpening process and/or of the shear bar adjustment may be integrated into the current working mode of the forage harvester.

In this regard, in one or some embodiments, one aspect of the invention is based on the consideration of directly counteracting minute decreases in cutting sharpness so that the cutting sharpness remains almost the same (e.g., within 10% of the same level of cutting sharpness; within 5% of the same level of cutting sharpness; within 4% of the same level of cutting sharpness; within 3% of the same level of cutting sharpness; within 2% of the same level of cutting sharpness; or within 1% of the same level of cutting sharpness). This consideration may be driven by reducing fuel consumption or keeping the fuel consumption of the forage harvester at the minimum level. In one or some embodiments, this may be performed by monitoring, such as continuously monitoring, the current cutting sharpness of the chopping blades or the distance of the shear bar, and reacting or responding to changes by resharpening and/or adjusting or adapting the distance. In one or some embodiments, the optimum range of the current cutting sharpness of the chopping blades is the cutting sharpness which may be achieved after running through one to a predetermined maximum of sharpening cycles (e.g., three sharpening cycles) during a single interruption of the harvesting process. The adaptation of the distance of the shear bar integrated into the current working mode of the forage harvester may be dependent or independent of the execution of at least one sharpening cycle. Thus, shorter servicing or downtimes may be achieved for sharpening and/or adapting the distance by keeping the cutting sharpness of the chopping blades essentially at the level of a new chopping blade.

In one or some embodiments, the blade sharpening and shear bar adjusting device may be configured to perform the sharpening process and/or the shear bar adjustment during one, such as every, trip in the headland and/or when performing one, such as every, changing process of a transport or transfer vehicle accompanying the forage harvester during an ongoing working mode. Therefore, in one or some embodiments, all available interruptions of the ongoing working mode may be used to keep the cutting sharpness of the chopping blades essentially within the range of new chopping blades. The same may apply to the adaptation or modification of the distance of the shear bar, for which all available interruptions of the ongoing working mode may be used to maintain the minimum preset distance to the cutting edge of the chopping blades, which may maintain a high chopping quality. These measures may reduce the wear on the shear bar and/or the chopping blades caused by the chopping process, which may be accompanied by increased service lives of the shear bar and the chopping blades. Maintaining the cutting sharpness may result in a lower average power requirement and therefore a reduction in fuel consumption by the drive motor.

In particular, in one or some embodiments, the control unit may be configured to identify the arrival at and/or departure from a headland, and/or the performance of a process of changing of a transport or transfer vehicle during the harvesting process. The arrival at and departure from a headland may be identified by the control unit, for example, by detecting the lifting and lowering of the attachment (e.g., the control unit may identify a state of the attachment based on the attachment providing its state to the control unit and/or the control unit polling the attachment for its state). In addition or alternatively, the control unit may monitor a steering angle and/or the harvested material throughput in order for the control unit to identify the arrival at and/or departure from a headland. Furthermore, the forage harvester may include a headland management system that may be configured to provide data on arriving at and departing from headlands of a field to be worked and the associated duration of headland travel. In addition, the control unit may use a sensor-based monitoring of the transferring process to the transport or transfer vehicle in order for the control unit to detect a changing process. Accordingly, responsive to the control unit identifying the arrival at and/or departure from a headland, and/or the performance of a process of changing of a transport or transfer vehicle during the harvesting process, the control unit may control the blade sharpening and shear bar adjusting device to perform at least one sharpening cycle and/or shear bar adjustment depending on the duration of interruption. In all of the aforementioned situations, in one or some embodiments, the control unit may be configured to provide a warning to the operator of the forage harvester if a sharpening cycle and/or shear bar adjustment is not completed before the headland has been left or the changing process is completed (e.g., the control unit may generate an output on a screen visible to the operator indicating that the sharpening cycle and/or shear bar adjustment is not completed).

In one or some embodiments, the control unit may be configured to input and/or select parameters of the blade sharpening and shear bar adjusting device, wherein the parameters may be a number of sharpening cycles to be performed and/or a shear bar adjustment frequency. In one or some embodiments, the parameters may be input and/or selected using an input/output device (e.g., a touch screen) in the cab of the forage harvester. Alternatively, a mobile data processing device, such as a cell phone, smartphone, or a tablet, may be used as the input/output device which may communicate wirelessly and/or wired with the control unit for this purpose. In one or some embodiments, the control unit may be configured to suggest standard parameters from which the operator to select using the input/output device, thereby providing operator input. In addition, in one or some embodiments, the control unit may be configured to override the standard parameter(s) from an input by the operator.

In one or some embodiments, the control unit may be configured to control the blade sharpening and shear bar adjusting device depending on a crop type to be entered or selected, and/or a strategy selection. Crop type-dependent control may take into account the different influences on the wear of the chopping blades and/or the distance of the shear bar to the cutting edge. For example, when harvesting grass or whole plant silage, it may be prudent to resharpen the chopping blades more frequently since these are subject to greater wear due to the intake of stones and sand than with other crop types, such as corn. In the case of harvesting corn, on the other hand, it may be prudent to adapt the distance of the shear bar to the cutting edge of the chopping blades more frequently in relation to resharpening since, with this type of crop, the self-sharpening effect of the chopping blades makes frequent resharpening unnecessary, in contrast to processing grass. In many cases, simply adapting the distance of the shear bar is sufficient, which may considerably reduce the time required to carry out the measure.

In contrast, strategy-based control of the blade sharpening and shear bar adjusting device may take into account objectives, such as maintaining a chopping quality or maintaining the cutting sharpness. For example, a shear bar adjustment strategy may be selected which ensures frequent adjustment of the shear bar in relation to the number of sharpening cycles. In this case, the number of adjustment processes may be independent of the number of performed sharpening cycles. A cutting edge sharpening strategy may provide more frequent execution of sharpening cycles to compensate for knife wear. The shear bar may be adapted depending on a settable or predetermined number of sharpening cycles to be performed.

In particular, the control unit may be configured to determine the time driving in a headland in order to determine a possible number of sharpening cycles depending on the determined travel time. For example, the control unit may first access or determine a distance of driving in the headland based on based on previous distances recorded while driving in the headland. The control unit may further determine a current speed (or an average speed while driving in the headland based on previous driving in the headland). Based on the distance and speed of driving in the headland, the control unit may determine the time driving in the headland.

In one or some embodiments, the monitoring device may comprise one or more sensors configured to determine the distance of the shear bar to the cutting edge or to automatically generate data (e.g., sensor signals or sensor data) indicative of the distance of the shear bar to the cutting edge. The monitoring device may transmit the sensor signals to the control unit in order for the control unit to evaluate the sensor signals. In turn, the control unit is configured to use the evaluated sensor signals to determine the occurrence of vibrations (e.g., analyze whether vibrations are occurring) which may at least influence the adaptation of the distance of the shear bar to the cutting edge. In particular, the occurrence of vibrations may influence the accuracy and/or uniformity of the adaptation of the distance of the shear bar to the cutting edge.

In this case, the control unit may be configured to reduce the travel speed and/or the drive speed of a drive motor of the forage harvester during headland travel or a changing process, such as automatically change, depending on a threshold value for the occurring vibrations. The automatic reduction of the driving speed and/or the driving speed of the drive motor may be advantageous, since the automatic reduction may allow prompt reaction in order to be able to use the limited time window available for headland driving. Also contemplated is a manual reduction of the travel speed and/or the drive speed by the operator after a corresponding warning has been issued by the control unit (e.g., the control unit outputs a request to the operator on a touchscreen requesting to reduce the travel speed and/or drive speed; responsive thereto, the operator may provide a manual input on the touchscreen authorizing the reduction, thereby providing manual confirmation). By reducing the travel speed and/or the drive speed, the vibrations may at least be reduced. After the adaptation or change of the distance of the shear bar to the cutting edge, the control unit may be configured to automatically readjust the reduced travel speed and/or drive speed of the drive motor to the original value.

In one or some embodiments, the control unit may be configured to transfer the shear bar to a secured position at a significant distance from the chopping blades when the adjustment process of the shear bar is interrupted due to excessive vibrations. To accomplish this, the distance to be set may be increased by a value of 0.2 mm or more, for example.

In order to prevent the chopping apparatus of the forage harvester from unintentionally being fed harvested material while resharpening or adjusting the shear bar, the control unit may be configured to automatically interrupt the operation of an attachment and/or a feed device of the forage harvester before performing a sharpening process and/or a shear bar adjustment while resharpening and adjusting. In this regard, the control unit may determine to perform the sharpening process and/or the shear bar adjustment. Responsive to the control unit determining to perform the sharpening process and/or the shear bar adjustment, the control unit may determine whether there is another operation being performed by the forage harvester that is to be interrupted, such as an operation performed by any one, any combination, or all of an attachment of the forage harvester, a feed device, or a chopping device. Thus, responsive to the control unit determining to perform the sharpening process and/or the shear bar adjustment and determining that there is another operation being performed by the forage harvester that is to be interrupted, the control unit may send a command to interrupt the another operation, then execute the sharpening process and/or the shear bar adjustment. After completing the sharpening process and/or the shear bar adjustment (e.g., after the duration of execution of the sharpening process and/or the shear bar adjustment), the control unit may send a command to stop the interruption, such as by restarting operations of any one, any combination, or all of an attachment of the forage harvester, a feed device, or a chopping device.

In one or some embodiments, performing the sharpening process and/or the shear bar adjustment may be manually confirmed by an operator of the forage harvester, thereby providing manual confirmation. In particular, using the input/output device, the control unit may output a message that at least one criterion specified by the operator, such as any one, any combination, or all of a time period between performing sharpening cycles, an achieved output per area, and/or an achieved throughput, is or are fulfilled. Responsive to the output on the input/output device, the operator may confirm the performance of the sharpening process and/or the shear bar adjustment by an entry on the input/output device so that the performance of the sharpening process and/or the shear bar adjustment occurs automatically during the next harvesting process interruption.

In one or some embodiments, the control unit may be configured for inputting and/or presetting the number of sharpening cycles and shear bar adjustment processes in relation to data on harvesting performance and/or the harvesting duration stored in an order management system. According to this embodiment, the control unit may control the knife sharpening and shear bar adjusting device in such a way that the number of sharpening cycles and adjustment processes of the shear bar are automatically apportioned to the harvesting performance and/or the harvesting duration. In particular, the apportionment may be performed as a function of any one, any combination, or all of time; area; or tonnage.

In particular, the control unit may be configured to perform the sharpening process and/or the shear bar adjustment automatically depending on signals that may be automatically generated from a cutting sharpness sensor array of the monitoring device. In this fully automated embodiment, the control unit may independently determine the number and points in time at which the sharpening process and/or the shear bar adjustment integrated into the current working mode of the forage harvester take place. Thus, the control unit may automatically receive data that is automatically generated and indicative of the cutting sharpness of the chopping blades. In turn, the control unit may be configured to: automatically analyze the data indicative of the cutting sharpness of the chopping blades; and automatically configured, based on the analysis of the data indicative of the cutting sharpness of the chopping blades, to perform one or both of the sharpening process or the shear bar adjustment automatically.

In one or some embodiments, a method for operating a self-propelled forage harvester is disclosed. In particular, a method for operating a self-propelled forage harvester may comprise: evaluating information about the state of wear of the chopping blades and/or the distance of the shear bar to the cutting edge; comparing the evaluated information with one or more limit values for the state of wear and/or the distance, wherein the limit value(s) may form a lower limit for an optimum range of the current or predefined cutting sharpness (e.g., instantaneous cutting sharpness) of the chopping blades or a predefined distance (e.g., a predefined distance of the shear bar to the cutting edge to be maintained by the blade sharpening and shear bar adjusting device during the harvesting process); and triggering an initialization of a sharpening process and/or a shear bar adjustment by the blade sharpening and shear bar adjusting device when the limit value is reached, wherein the performance of the sharpening process and/or the shear bar adjustment may be integrated into the current working mode of the forage harvester.

The sharpening process and/or the shear bar adjustment may be performed by the blade sharpening and shear bar adjusting device while traveling, such as always while traveling in the headland, and/or while changing, such as always while changing a transport or transfer vehicle accompanying the forage harvester during the current working mode.

In particular, the sharpening process and/or the shear bar adjustment may be triggered manually by an operator depending on data saved in an order management system on the harvesting performance and/or harvesting duration, or fully automatically (e.g., without any operator intervention) depending on signals from a cutting sharpness sensor array of the monitoring device (e.g., the control unit may automatically control, based on the cutting sharpness sensor array, the sharpening process and/or the shear bar adjustment).

Referring to the figures, FIG. 1 shows a schematic diagram of a self-propelled forage harvester 1 inside view, which may receive a harvesting header 3 in its front region using a feed channel 2. In the rear area of the harvesting header 3, infeed and prepress rollers 4 arranged or positioned in pairs in the feed channel 2 are associated with the latter, which may receive a stream of harvested material 5 coming from the harvesting header 3, compress it and transfer it in their rear region to a chopping apparatus 6. The chopping apparatus 6 comprises a cutterhead 7 which may be equipped with chopping blades 8. The revolving chopping blades 8 are moved past a so-called shear bar 11 in the infeed region 10 of the cutterhead 7 through which the flow of harvested material 5 to be ground is conveyed. In the rear region of the cutterhead 7, the ground harvested material is then transferred either to a reshredding apparatus 13 designed as a so-called cracker 12, or directly to a post-acceleration apparatus 14. While the reshredding apparatus 13 further grinds the particulate components of the flow of harvested material 5 such as corn grains, the post-accelerator apparatus 14 accelerates the flow of harvested material 5 such that it is moved through a discharge chute 15 and leaves the forage harvester 1 at the end in the region of a discharge flap 16 and may be transferred to a transport or transfer vehicle (not shown).

In order to be able to sharpen the chopping blades 8 of the cutterhead 7 without having to remove the individual chopping blades 8 or the cutterhead 7 as a whole, a blade sharpening apparatus 17 known per se is provided above the cutterhead 7 and comprises a grinding stone 18, a grinding stone holder 19 associated therewith, and a running axle 20 on which the blade sharpening apparatus 17 is movably mounted parallel to the cutterhead 7, and a drive 50 (shown in FIG. 3), known per se, for operating the blade sharpening apparatus 17. In one or some embodiments, the control unit 21 is associated with the blade sharpening apparatus 17 in order for the control unit 21 to control the blade sharpening apparatus 17. In one or some embodiments, the control unit 21 is connected to or in communication with (e.g., wired and/or wirelessly) an input/output device 22 in the cab 23 of the forage harvester 1. In one or some embodiments, the input/output device 22 comprises a touchscreen. Other input/output devices 22 are contemplated.

The control unit 21 may include any type of computing functionality, such as at least one processor 51 (which may comprise a microprocessor, controller, PLA, or the like) and at least one memory 52. The memory 52 may comprise any type of storage device (e.g., any type of memory). Though the processor 51 and the memory 52 are depicted as separate elements, they may be part of a single machine, which includes a microprocessor (or other type of controller) and a memory. Alternatively, the processor 51 may rely on memory 52 for all of its memory needs.

The processor 51 and memory 52 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples. The above discussion regarding the at least one processor 51 and the at least one memory 52 may be applied to other devices, such as the order management system 49, discussed further below. Further, various functionality, such as the flow diagram depicted in FIG. 4, may be implemented by computer programming the control unit 21.

Figure 2:
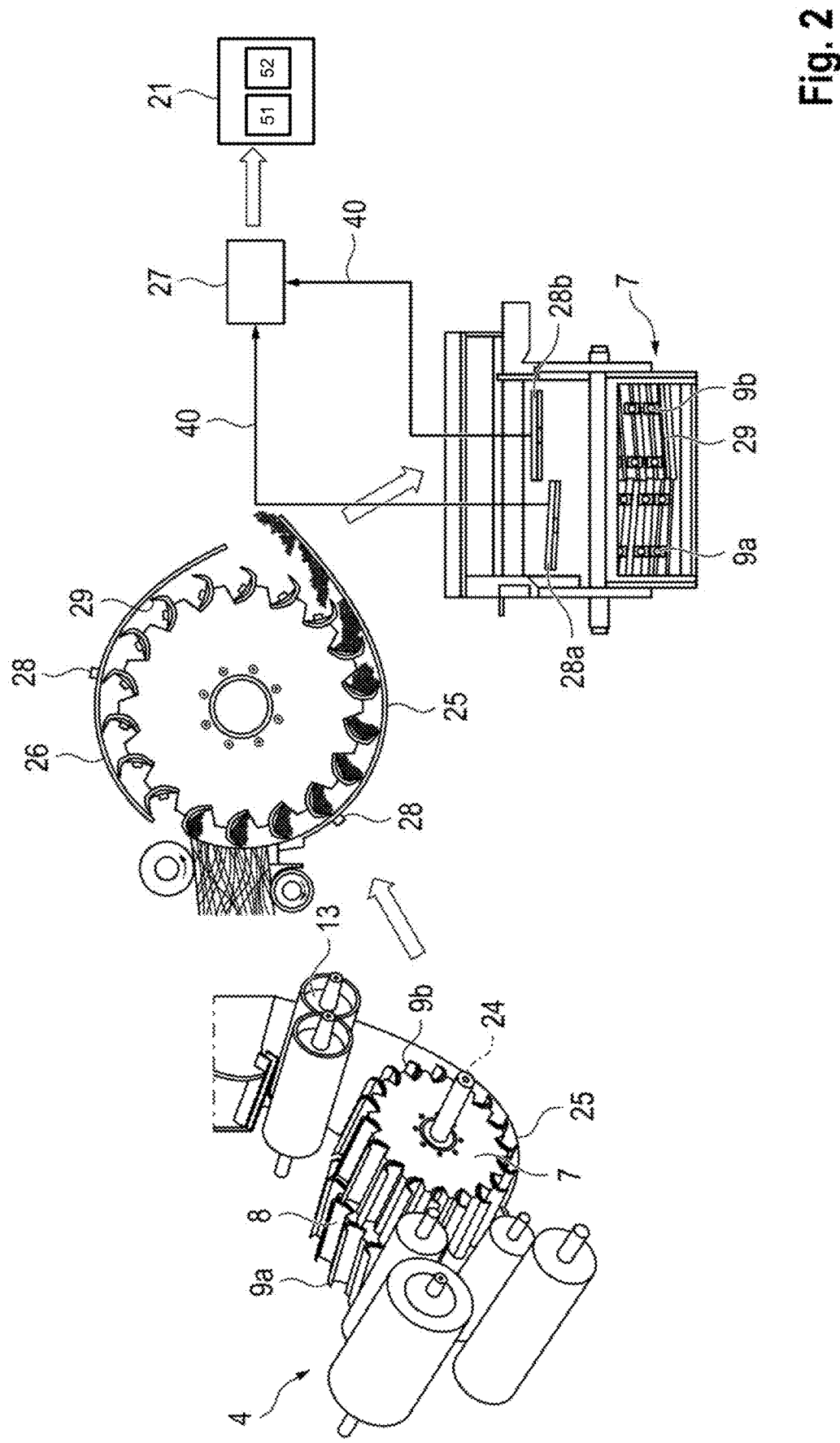
FIG. 2 schematically shows a detail view of a chopping apparatus of the forage harvester according to FIG. 1 with a monitoring device.

FIG. 2 schematically shows a detailed view of the chopping apparatus 6 of the forage harvester 1 according to FIG. 1 with a monitoring device 27. In one or some embodiments, the chopping apparatus 6 comprises right and left-side chopping blade assemblies 9a, 9b, wherein each chopping blade assembly 9a, 9b comprises a plurality of chopping blades 8 positioned on the circumference of the cutterhead 7 oblique to the axis of rotation 24 of the cutterhead 7. On the bottom side, the cutterhead 7 is sectionally encased by a drum bottom 25 which may be made of stainless steel. On the upper side, the cutterhead 7 is sectionally enclosed by a drum rear wall 26, which may also be made of stainless steel. In one or some embodiments, the monitoring device 27 comprises at least one cutting sharpness sensor array 28 which, according to the embodiment shown in FIG. 2, may either be positioned on the drum rear wall 26 or on the drum bottom 25 and may automatically generate data indicative of cutting sharpness of the chopping blades. It is also contemplated to arrange or position a sensor sharpness of cutting sharpness sensor array 28 both on the drum bottom 25 as well as on the drum rear wall 26. In one or some embodiments, the at least one at least cutting sharpness sensor array 28 includes two sensor devices 28a, 28b. Independent of the specific position of the at least one cutting sharpness sensor array 28, each cutterhead 7 may be assigned these two sensor devices 28a, 23b such that each one of the sensor devices 28a, 23b is assigned to the associated chopping blade assembly 9a, 9b, wherein each sensor devices 28a, 23b may completely cover a cutting edge 29 of the particular chopping blade 8 so that each cutting edge 29 may be detected over its entire length by the particular sensor device 28a, 23b. The particular sensor device 28a, 28b may either be positioned parallel to the axis of rotation 24 of the cutterhead 7, or parallel to the cutting edge 29 of the chopping blades 8 on the drum bottom 25 and/or the drum rear wall 26. The illustration on the bottom right in FIG. 2 shows an example of the potential alignments of the sensor devices 28a, 28b in a single illustration.

In one or some embodiments, the monitoring device 27 and the blade grinding and shear bar adjusting device 43 are in communication with the control unit 21, such as in wired and/or wireless communication with the control unit 21.

In one or some embodiments, all sensor devices 28a, 28b are either positioned parallel to the axis of rotation 24 of the cutterhead 7, or parallel to the cutting edge 29 of the chopping blades 8. In the illustrated embodiment, the sensor devices 28a, 28b of the cutting sharpness sensor array 28 are in the form of inductive sensors, wherein each of the sensor devices 28a, 28b comprises one or more magnetic exciter arrays and a pole arrangement interacting with the magnetic exciter arrays. With regard to the structure and mode of operation of the sensor devices 28a, 28b of the cutting sharpness sensor array 28, which may be designed as induction sensors, and the evaluation of the sensor signals by the control unit 21, reference is made to the publication DE 10 2019 112 973 A1, incorporated by reference herein in its entirety; see also US Patent Application Publication No. 2020/0359563 A1, incorporated by reference herein in its entirety.

Figure 3:
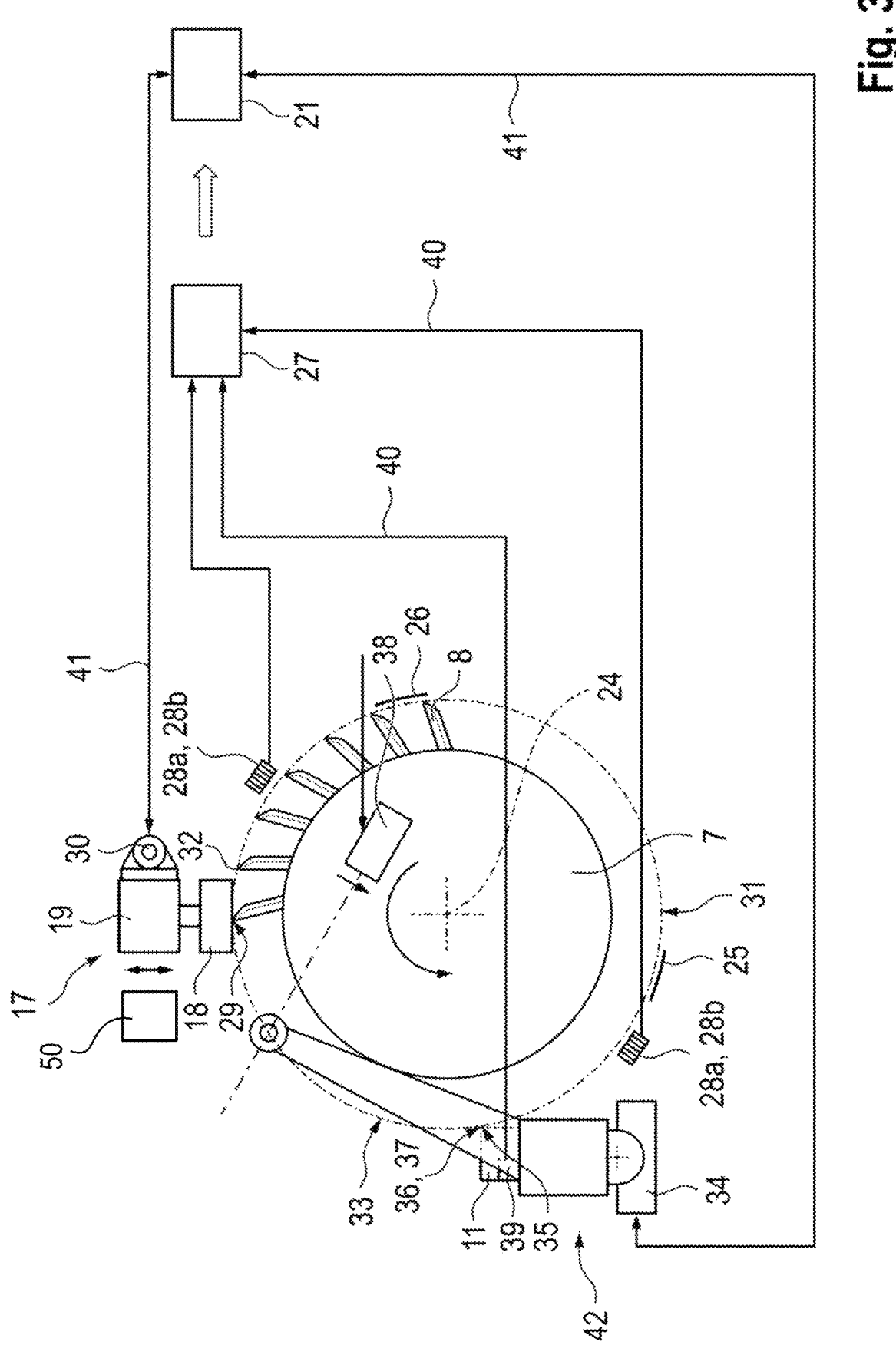
FIG. 3. schematically shows a detail view of a cutterhead of the chopping apparatus with a device for adjusting a shear bar.

The illustration in FIG. 3 shows a detail view of the cutterhead 7 with a device 42 for adjusting the shear bar 11. As described above, the sensor devices 28a, 28b are associated with the cutterhead 7 in the region of the drum bottom 25 and/or the drum rear wall 26 and determine the state of wear of the chopping blades 8. In its upper side region, the blade sharpening apparatus 17 is associated with the cutterhead 7, wherein the blade sharpening apparatus 17 comprises at least the grinding stone 18, the grinding stone holder 19 holding the grinding stone 18, and an adjusting cylinder 30 moving the grinding stone holder 19 parallel to the axis of rotation 24 of the cutterhead 7. The grinding stone 18 may be guided in a manner known per se using the grinding stone holder 19 parallel to the axis of rotation 24, such that when the grinding stone holder 19 is in a non-working position, it is positioned on the side of the cutterhead 7, and when it is in the illustrated working position, it is guided along the envelope 31 spanned by the chopping blades 8 during rotation of the cutterhead 7, so that the grinding stone 18 sweeps over at least the grinding surface length of a respective blade back 32 of the chopping blades 8.

The shear bar 11 associated with the cutterhead 7 may be guided in a pivotable manner by a pivot mechanism 33 in a bearing 34 associated with the bottom of the shear bar 11, wherein the pivot mechanism 33 is part of the device 42 for adjusting the shear bar 11. An edge 35 of the shear bar 11 facing the cutterhead 7 may be positioned at a certain distance 36 (e.g., a predetermined distance) of the shear bar 11 from the cutting edge 29, the so-called cutting gap 37, from the envelope 31 of the cutterhead 7. Furthermore, at least one servomotor 38 may be associated with the pivoting mechanism 33 in a likewise known manner, and may enable a change in position of the shear bar 11 and therefore a change in the cutting gap 37. The servomotor 38 may also be part of the device 42 for adjusting the shear bar 11. In addition, the shear bar 11 may accommodate one or more so-called knock sensors 39, which may enable the control unit 21 to determine the distance of the shear bar 11 from the envelope 31 of the cutterhead 7 using vibration analysis, wherein the knock sensors 39 may also be part of the device 42 for adjusting the shear bar 11. The blade sharpening apparatus 17 and the components 33, 34, 38, 39 of the device 42 for adjusting the shear bar 11 together may form a blade sharpening and shear bar adjusting device 43, which may be controlled by the control unit 21.

In one or some embodiments, the monitoring device 27 is connected by signal lines 40 to the sensor devices 28a, 28b and the at least one knock sensor 39. The control unit 21 may be bidirectionally connected (e.g., bidirectional communication) to the blade sharpening apparatus 17 and the swivel mechanism 33 by control lines 41 in order to transmit control commands to them as well as to receive operating signals from them.

In one or some embodiments, the control unit 21 may be configured to evaluate the information provided by the monitoring device 27 regarding a state of wear of the chopping blades 8 and the distance 36 of the shear bar 11 from the cutting edge 29. The result of the evaluation of the state of wear of the chopping blades 8 and the distance 36 of the shear bar 11 to the cutting edge 29 may be compared with a limit value for the state of wear to be maintained and/or the distance to be maintained. In one or some embodiments, the limit value may form a lower limit for an optimum range of the instantaneous cutting sharpness of the chopping blades 8 or the distance 36 to be maintained by the blade sharpening and shear bar adjusting device 43 during the harvesting process. In one or some embodiments, the control unit 21 may be configured to automatically trigger an initialization of a sharpening process and/or a shear bar adjustment by the blade sharpening and shear bar adjusting device 43 when at least one limit value is reached (e.g., the control unit 21 may automatically send a command to the blade sharpening and shear bar adjusting device 43; responsive to receiving the command, the blade sharpening and shear bar adjusting device 43 may begin the sharpening process and/or the shear bar adjustment), wherein the execution of the grinding process and/or the shear bar adjustment for adapting or modifying the distance 36 is or are integrated into the ongoing working mode of the forage harvester 1.

In one or some embodiments, the blade grinding and shear bar adjusting device 43 is configured to perform the sharpening process and/or the shear bar adjustment during at least one trip, such as during every trip, in a headland, and/or during at least one change, such as during every change, of a transport or transfer vehicle accompanying the forage harvester 1 during the current working mode. For this purpose, the control unit 21 may be configured to determine the arrival at and/or departure from a headland, or the performance of a changing process of a transport or transfer vehicle during the harvesting process.

In one or some embodiments, the control unit 21 may use sensor-based monitoring of the transferring process to the transport or transfer vehicle in order to detect a changing process. For example, a camera 44 arranged or positioned on the discharge chute 15 may be provided for sensor-based monitoring of the transfer process of harvested material to the transport or transfer vehicle. In this context, the camera 44 may also be used to detect the changeover process of a transport or transfer vehicle. Since the evaluation of the images provided by the camera 44, which may be done by the control unit 21 or by an image evaluation system communicating with the control unit 21, may deduce an interruption of the transfer operation for a change, this interruption may be used, for example, to perform a shear bar adjustment. In this context, the control unit 21 may be configured to be able to distinguish, by evaluating the images, between an interruption for a changeover process, which may comprise a period of time that enables, for example, a shear bar adjustment to be performed, and an approximately uninterrupted changeover process, if another transport or transfer vehicle is already accompanying the forage harvester 1 in parallel in order to replace the fully loaded transport or transfer vehicle. The former may be done, for example, by determining throughput in conjunction with determining the current travel speed. If the throughput drops to zero and the forage harvester 1 comes to a standstill while the other working units, such as the infeed and prepress rollers 4 or the chopping apparatus 6, continue to be driven, the control unit 21 may interpret this as an interruption for a changeover process.

In one or some embodiments, the arrival at and departure from a headland may be determined, for example, by detecting the lifting and lowering of the attachment (e.g., harvesting header 3). In addition, a steering angle and/or the harvested material throughput may be monitored to determine the arrival at departure from a headland. Furthermore, the forage harvester 1 may include a headland management system that provides data on arriving at and departing from headlands of a field to be worked and the associated duration of headland travel. The use of the headland management system may be accompanied by the use of a positioning sensor 45 of a global positioning system such as GPS or the like.

FIG. 4 shows a simplified functional diagram of the interaction of the control unit 21, monitoring device 27 and blade grinding and shear bar adjusting device 43. FIG. 4 further shows three modes 46, 47, 48 which may be selectable using the input-output device 22 for their configuration and activation.

In one or some embodiments, performing the sharpening process and/or the shear bar adjustment may be manually confirmed by an operator of the forage harvester 1. For this purpose, a manual mode 46 is provided which may require specifications regarding the number of sharpening cycles to be performed as well as shear bar adjustments in relation to data that may be entered or selected for the harvesting performance (area and/or yield) and/or harvesting duration. The operator may personally enter a value for the number of sharpening cycles and shear bar adjustments or select a default value provided by the control unit 21 for this purpose.

For example, the operator may set or select a number of 3 sharpening cycles in relation to an area of 1 hectare to be worked and a number of 1 shear bar adjustments in relation to an area of 10 hectares to be worked using the input/output device 22. In addition, the manual mode 46 may provide the operator with the ability to disable the initialization and execution of one or both processes, regrinding and/or shear bar adjustment. The control unit 21 may monitor the specifications made by the operator by inputting or selecting and is configured to output a reminder through the input-output device 22 to perform the regrinding and/or the shear bar adjustment when the specified value or values are reached. The operator may then actively confirm the execution of the regrinding and/or the shear bar adjustment. The control unit 21 in turn may then automatically determines the next possible time to perform the regrinding and/or the shear bar adjustment during the current working mode of the forage harvester 1 and then control this.

An automatic mode 47 may extend the manual mode 46 such that the control unit 21 is configured to determine a specified number of sharpening cycles and adjustment operations with reference to data stored in an order management system 49 concerning the harvesting performance (area and/or yield) and/or harvesting duration. For this purpose, the control unit 21 may communicate with the order management system 49, which may be executed on a remote computer, such as a remote data processing system, in order to obtain therefrom the necessary data for the area to be worked by the forage harvester 1.

Furthermore, the control unit 21 operated in automatic mode 47 may be configured to control the blade sharpening and shear bar adjusting device 43 depending on a crop type to be entered or selected, and/or a strategy selection. Crop type-dependent control may take into account the different influences on the wear of the chopping blades 8 and/or the distance of the shear bar 11 to the cutting edge 29. For example, when harvesting grass or whole plant silage, it is prudent to resharpen the chopping blades 8 more frequently since these are subject to greater wear due to the intake of stones and sand than with other types of crop such as corn. In the case of harvesting corn, on the other hand, it is prudent to adapt the distance of the shear bar 11 to the cutting edge 29 of the chopping blades 8 more frequently in relation to resharpening since, with this type of crop, the self-sharpening effect of the chopping blades 8 makes frequent resharpening unnecessary, in contrast to processing grass. In many cases, simply adapting the distance 36 of the shear bar 11 may be sufficient, which may considerably reduce the time required to perform the measure. Here as well, the control unit 21 may receive appropriate data regarding the crop type and associated strategy selection from the order management system 49.

In contrast, strategy-based control of the blade sharpening and shear bar adjusting device 43 may take into account objectives such as maintaining a chopping quality or maintaining the cutting sharpness. For example, a shear bar adjustment strategy may be selected by the operator which ensures frequent adjustment of the shear bar in relation to the number of sharpening cycles. In this case, the number of adjustment processes may be independent of the number of performed sharpening cycles. A cutting edge sharpening strategy selectable by the operator may provide for more frequent execution of sharpening cycles to compensate for knife wear. The shear bar 11 is adapted depending on a settable or selectable number of sharpening cycles to be performed.

In principle, the automatic mode 47 may allow the operator to override the number of sharpening cycles and/or shear bar adjustments provided by the control unit 21.

In one or some embodiments, the control unit 21 operated in fully automatic mode 48 may be configured to perform the sharpening process and/or the shear bar adjustment automatically depending on signals from the cutting sharpness sensor array 28 of the monitoring device 27. In this fully automated embodiment, the control unit 21 may independently determine the number of times and points at which the sharpening process and/or the shear bar adjustment are integrated into the current working mode of the forage harvester 1. The fully automatic mode may be an extension of the automatic mode 47.

In one or some embodiments, the input-output device 22 may allow the operator to select the respective mode 46, 47 or 48 in which the control unit 21, and associated therewith, the blade grinding and shear bar adjusting device 43, is to be operated.

A further feature is that the monitoring device 27 is configured using the knock sensors 39 to determine the distance 36 of the shear bar 11 from the cutting edge 29, wherein the monitoring device 27 transmits sensor signals to the control unit 21 for evaluation. The control unit 21 may be configured to use the sensor signals from the knock sensors 39 to determine the occurrence of vibrations, which may influence or affect the adaptation of the distance 36 of the shear bar 11 to the cutting edge 29. The control unit 21 may be configured to reduce the travel speed and/or the drive speed of a drive motor of the forage harvester 1 during headland travel or a changing process as a function of a threshold value for the occurring vibrations, in order to reduce the vibrations at least to such an extent that adaptation of the distance 36 of the shear bar 11 is possible with the necessary accuracy to prevent damage to the chopping blades 8. The control unit 21 may further be configured to transfer the shear bar 11 to a secured position at a significant distance from the chopping blades 8 in the event of an interruption of the shear bar adjustment process due to excessive vibrations, which may be detected using the knock sensors 39. To accomplish this, the distance 36 to be set may be increased by a value of 0.2 mm or more in order to set a sufficient distance from the envelope 31.

In one or some embodiments, the control unit 21 may be configured to automatically interrupt the operation of the attachment (e.g., harvesting header 3) and/or the feed device 25 (e.g., the infeed and prepress rollers 4, and/or the chopping apparatus 6 of the forage harvester 1) before executing a sharpening process and/or a shear bar adjustment for the duration of execution. Interrupting the operation of the attachment (e.g., harvesting header 3) and the infeed and prepress rollers 4 may have the effect of reducing vibrations that affect the adjustment process of the shear bar adjustment. Another effect may be a reduction in the amount of dirt entering the blade sharpening apparatus 17. Furthermore, this may make it easier to blow out or recirculate dirt from the blade sharpening apparatus 17.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Forage harvester
2 Feed channel
3 Harvesting header
4 Infeed and prepress rollers
5 Harvested material flow
6 Chopping apparatus
7 Cutterhead
8 Chopping blade
9a Cutting blade assembly
9b Cutting blade assembly
10 Infeed area
11 Shear bar
12 Cracker
13 Re-shredding apparatus

14 Post-acceleration apparatus
15 Discharge chute
16 Discharge flap
17 Blade sharpening apparatus
18 Grindstone
19 Grinding stone holder
20 Running axle
21 Control unit
22 Input-output device
23 Cab
24 Rotational axis
25 Drum bottom
26 Drum rear wall
27 Monitoring device
28 Cutting sharpness sensor array
28a Sensor device
28b Sensor device
29 Cutting edge
30 Actuating cylinder
31 Envelope
32 Blade back
33 Swivel mechanism
34 Bearing
35 Edge
36 Distance
37 Cutting gap
38 Control motor
39 Knock sensor
40 Signal line
41 Control line
42 Device
43 Blade sharpening and shear bar adjusting device
44 Camera
45 Positioning sensor
46 Manual mode
47 Automatic mode
48 Fully automated mode
49 Order management system
50 Drive
51 Processor
52 Memory

The invention claimed is:

1. A self-propelled forage harvester comprising:
a blade grinding and shear bar adjusting device configured to:
    regrind chopping blades positioned on a cutterhead of a chopping device; and
    adjust a distance of a shear bar associated with the cutterhead from a cutting edge of the chopping blades;
at least one monitoring device configured to generate data indicative of one or both of a state of wear of the chopping blades or the distance of the shear bar from the cutting edge at least partly during operating the forage harvester in a current ongoing working mode;
a control unit in communication with the blade griding and shear bar adjusting device and the at least one monitoring device, the control unit configured to:
    compare the data generated by the at least one monitoring device indicative of the one or both of the state of wear of the chopping blades or the distance of the shear bar to the cutting edge with at least one limit value for one or both of the state of wear or the distance of the shear bar to the cutting edge, wherein the at least one limit value comprises one or both of a predefined cutting sharpness of the chopping blades or a predefined distance of the shear bar to the cutting edge during a harvesting process, and wherein the at least one limit value comprises a lower limit for an optimum range to be maintained by the blade sharpening and shear bar adjusting device; and responsive to determining that the at least one limit value is reached, automatically command one or both of a sharpening process or a shear bar adjustment by the blade sharpening and shear bar adjusting device, wherein the execution of the one or both of the sharpening process or the shear bar adjustment is integrated into the current ongoing working mode of the forage harvester.

2. The self-propelled forage harvester of claim 1, wherein the control unit is further configured to:

determine one or both of driving in a headland or performing a changing process of a transport or transfer vehicle accompanying the forage harvester, wherein the control unit is configured to determine driving in the headland by determining an arrival at and departure from the headland; and responsive to determining the one or both of driving in a headland or performing the changing process of the transport or transfer vehicle accompanying the forage harvester, command the blade sharpening and shear bar adjusting device to perform the one or both of the sharpening process or the shear bar adjustment.

3. The self-propelled forage harvester of claim 1, wherein the control unit is configured to automatically compare the data generated by the at least one monitoring device indicative of both of the state of wear of the chopping blades and the distance of the shear bar to the cutting edge with the at least one limit value for both of the state of wear and the distance of the shear bar to the cutting edge; and wherein responsive to determining that the at least one limit value for both of the state of wear and the distance of the shear bar to the cutting edge being reached, the control unit is configured to automatically command one or both of the sharpening process or the shear bar adjustment by the blade sharpening and shear bar adjusting device.

4. The self-propelled forage harvester of claim 3, wherein responsive to determining that the at least one limit value for both of the state of wear and the distance of the shear bar to the cutting edge being reached, the control unit is configured to automatically command both of the sharpening process and the shear bar adjustment by the blade sharpening and shear bar adjusting device.

5. The self-propelled forage harvester of claim 1, wherein the control unit is further configured to perform one or both of inputting or select parameters of the blade sharpening and shear bar adjusting device; and wherein the parameters comprise a number of sharpening cycles to be performed and a frequency of shear bar adjustment.

6. The self-propelled forage harvester of claim 1, wherein the control unit is further configured to determine one or both of a crop type to be entered or selected, or a strategy selection; and wherein the control unit is configured to control the blade sharpening and shear bar adjusting device depending on the one or both of the crop type to be entered or selected, or the strategy selection.

7. The self-propelled forage harvester of claim 1, wherein the control unit is further configured to:

determine a travel time driving the forage harvester in a headland;

determine, based on the travel time driving the forage harvester in the headland, a number of sharpening cycles;

determine that the forage harvester is driving in the headland; and responsive to determining that the forage harvester is driving in the headland, command the blade grinding and shear bar adjusting device to perform the number of the sharpening cycles at least partly while driving in the headland.

8. The self-propelled forage harvester of claim 1, wherein the at least one monitoring device comprises one or more sensors configured to generate sensor data indicative of the distance of the shear bar to the cutting edge;

wherein the at least one monitoring device is configured to transmit the sensor data indicative of the distance of the shear bar to the cutting edge to the control unit;

wherein the control unit is configured to analyze the sensor data indicative of the distance of the shear bar to the cutting edge to determine occurrence of vibrations; and wherein the control unit, responsive to determining the occurrence of vibrations, is configured to modify at least one operation of the forage harvester.

9. The self-propelled forage harvester of claim 8, wherein the control unit is configured to:

determine one or both of driving in a headland or performing a changing process of a transport or transfer vehicle accompanying the forage harvester; and wherein the control unit, responsive to determining the vibrations are greater than a threshold value and responsive to determining the one or both of driving in a headland or performing a changing process of a transport or transfer vehicle accompanying the forage harvester, is configured to reduce one or both of travel speed or drive speed of a drive motor of the forage harvester during travel in the headland or during the changing process.

10. The self-propelled forage harvester of claim 1, wherein the control unit, responsive to determining to perform the one or both of the sharpening process or the shear bar adjustment and responsive to determining that another operation is being performed by one or more of an attachment, a feed device, or a chopping device, the control unit is further configured to command interruption of the another operation during the current ongoing working mode of the one or more of the attachment, the feed device, or the chopping device before executing the one or more of the sharpening process or the shear bar adjustment for at least a duration of execution of the one or more of the sharpening process or the shear bar adjustment.

11. The self-propelled forage harvester of claim 1, wherein the control unit is further configured to:

generate an output to an operator of the forage harvester requesting performance of one or both of the sharpening process or the shear bar adjustment; and responsive to generating the output, receiving an input from the operator indicating a manual confirmation by the operator to perform the one or both of the sharpening process or the shear bar adjustment.

12. The self-propelled forage harvester of claim 1, wherein the control unit comprises an input/output device configured for one or both of inputting or presetting a number of sharpening cycles and shear bar adjustment processes based on one or both of data on harvesting performance or harvesting duration stored in an order management system remote from the forage harvester.

13. The self-propelled forage harvester of claim 1, wherein the at least one monitoring device comprises a sensor array configured to automatically generate the data indicative of cutting sharpness of the chopping blades; and wherein the control unit is further configured to automatically analyze the data indicative of the cutting sharpness of the chopping blades; and wherein the control unit is automatically configured, based on the analysis of the data indicative of the cutting sharpness of the chopping blades, to perform one or both of the sharpening process or the shear bar adjustment automatically.

14. A method for operating a self-propelled forage harvester, the forage harvester comprising a blade grinding and shear bar adjusting device configured to regrind chopping blades positioned on a cutterhead of a chopping device and adjust a distance of a shear bar associated with the cutterhead from a cutting edge of the chopping blades, the method comprising:

generating, using at least one monitoring device, data indicative of one or both of a state of wear of the chopping blades or the distance of the shear bar from the cutting edge at least partly during operating the forage harvester in a current ongoing working mode;

comparing the data generated by the at least one monitoring device indicative of the one or both of the state of wear of the chopping blades or the distance of the shear bar to the cutting edge with at least one limit value for one or both of the state of wear or the distance of the shear bar to the cutting edge, wherein the at least one limit value comprises one or both of a predefined cutting sharpness of the chopping blades or a predefined distance of the shear bar to the cutting edge during a harvesting process, and wherein the at least one limit value comprises a lower limit for an optimum range to be maintained by the blade sharpening and shear bar adjusting device; and responsive to determining that the at least one limit value is reached, automatically command one or both of a sharpening process or a shear bar adjustment by the blade sharpening and shear bar adjusting device, wherein the execution of the one or both of the sharpening process or the shear bar adjustment is integrated into the current ongoing working mode of the forage harvester.

15. The method of claim 14, wherein the one or both of the sharpening process or the shear bar adjustment is performed by the blade sharpening and shear bar adjusting device at least partly while traveling in a headland or at least partly while changing a transport or transfer vehicle accompanying the forage harvester during the current ongoing working mode.

16. The method of claim 14, wherein the one or both of the sharpening process or the shear bar adjustment is performed by the blade sharpening and shear bar adjusting device at least partly each time while traveling in a headland or at least partly each time while changing a transport or transfer vehicle accompanying the forage harvester during the current ongoing working mode.

17. The method of claim 14, further comprising:

outputting data requesting performance of the one or both of wherein the one or both of the sharpening process or the shear bar adjustment;

receiving operator input indicative of approving the performance of the one or both of the sharpening process or the shear bar adjustment; and responsive to receiving the operator input, performing the one or both of the sharpening process or the shear bar adjustment.

18. The method of claim 14, wherein the one or both of the sharpening process or the shear bar adjustment is triggered fully automatically without any operator intervention depending on signals from at least one cutting sharpness sensor of the at least one monitoring device.

19. The method of claim 14, further comprising:

determining one or both of driving in a headland or performing a changing process of a transport or transfer vehicle accompanying the forage harvester; and responsive to determining the one or both of driving in a headland or performing the changing process of the transport or transfer vehicle accompanying the forage harvester, commanding the blade sharpening and shear bar adjusting device to perform the one or both of the sharpening process or the shear bar adjustment.

20. The method of claim 14, further comprising:

determining a travel time driving the forage harvester in a headland;

determining, based on the travel time driving the forage harvester in the headland, a number of sharpening cycles;

determining that the forage harvester is driving in the headland; and responsive to determining that the forage harvester is driving in the headland, commanding the blade grinding and shear bar adjusting device to perform the number of the sharpening cycles.

* * * * *